United States Patent [19]

Ansley et al.

[11] Patent Number: 5,267,061
[45] Date of Patent: Nov. 30, 1993

[54] NON-INTERFERING VIEWING SYSTEMS FOR USE IN CATADIOPTRIC PROJECTION SYSTEMS

[75] Inventors: David A. Ansley, Long Beach; Eric C. Haseltine, Manhattan Beach, both of Calif.

[73] Assignee: Hughes Aircraft Company, Los Angeles, Calif.

[21] Appl. No.: 899,580

[22] Filed: Jun. 12, 1992

Related U.S. Application Data

[63] Continuation of Ser. No. 481,548, Feb. 20, 1990, abandoned.

[51] Int. Cl.[5] .......................... G02B 3/00; G03H 1/00
[52] U.S. Cl. ...................... 359/15; 359/589; 359/722
[58] Field of Search ............... 350/174, 407, 438, 538, 350/503-505, 619-620, 443, 172, 3.6, 132, 163, 164, 166, 133, 137-138; 362/62; 358/108, 113; 359/464, 466, 471, 472, 577, 580, 589, 590, 722, 723, 1, 15, 19

[56] References Cited

U.S. PATENT DOCUMENTS

| | | | |
|---|---|---|---|
| 3,917,399 | 11/1975 | Buzawa e al. | 356/172 |
| 4,106,855 | 8/1978 | Coon | 5/253 |
| 4,134,644 | 1/1979 | Marks et al. | 350/132 |
| 4,202,601 | 5/1980 | Burbo et al. | 350/407 |
| 4,620,770 | 11/1986 | Wexler | 350/132 |
| 4,775,217 | 10/1988 | Ellis | 350/538 |
| 4,786,966 | 11/1988 | Hanson et al. | 358/108 |
| 4,834,515 | 5/1989 | Mercado | 359/727 |
| 4,884,137 | 11/1989 | Hanson et al. | 358/113 |
| 4,947,291 | 8/1990 | McDermott | 350/407 |

FOREIGN PATENT DOCUMENTS

| | | |
|---|---|---|
| 396128 | 11/1990 | European Pat. Off. |
| 2702496 | 8/1977 | Fed. Rep. of Germany |
| 1598040 | 9/1981 | United Kingdom |

*Primary Examiner*—Bruce Y. Arnold
*Assistant Examiner*—James Phan
*Attorney, Agent, or Firm*—Wanda K. Denson-Low

[57] ABSTRACT

Selective light-transmitting filters for use with catadioptic area-of-interest display projectors and projection system provide complementary filters for two or more persons. One of the complementary filters permits all radiance at one predetermined, desired wavelength to be transmitted while rejecting or absorbing all others. The complementary filter for a second viewer transmits substantially all radiance at a second predetermined desired wavelength and absorbs or reflects all others, thus permitting each viewer to see only predetermined, desired displays or parts of a display that are projected simultaneously within the system.

7 Claims, 3 Drawing Sheets

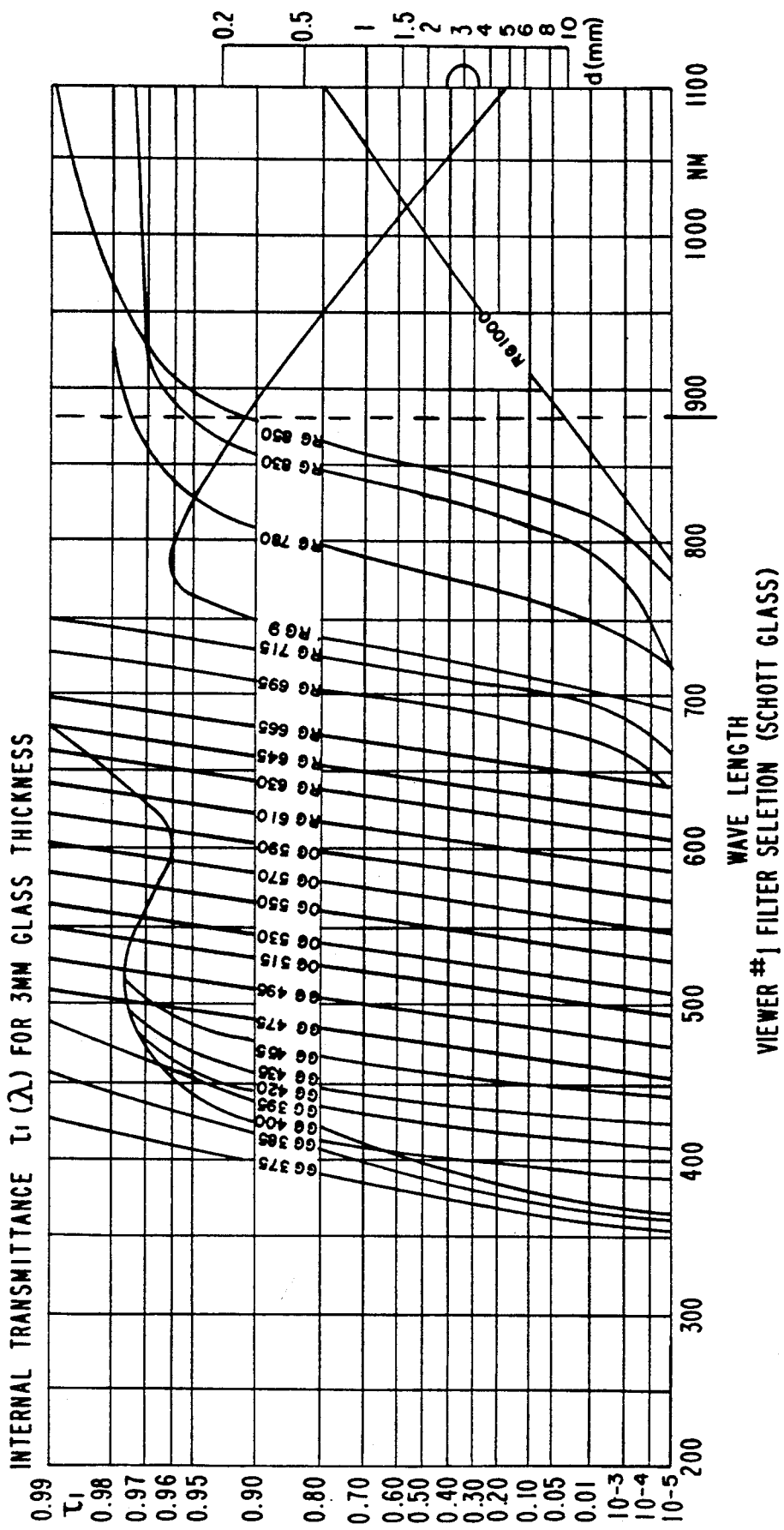

NON-INTERFERING VIEWING SYSTEMS FOR USE IN CATADIOPTRIC PROJECTION SYSTEMS

This is a continuation of application Ser. No. 07/481,548 filed Feb. 20, 1990 now abandoned.

BACKGROUND OF THE INVENTION

1. Field of the Invention

This invention relates to non-interfering viewing systems for use in catadioptric projection systems by two or more persons simultaneously viewing displays in such systems.

2. Description of Related Art

Until now, catadioptric area-of-interest display projectors and projection systems have utilized substantially the same displays for simultaneous viewing by two or more persons. A need has developed to provide independent, non-interfering, simultaneous area-of-interest displays for two or more persons.

SUMMARY OF THE INVENTION

This invention provides non-interfering area-of-interest display viewing means for two or more persons, hereafter sometimes called viewer No. 1 and Viewer No. 2, simultaneously looking at two or more different displays, hereafter sometimes called display No. 1 and display No. 2, within a single catadioptric projection system. Such viewing means permit each of two such persons to see only one of two simultaneous displays without interference from the other display.

The viewing means for each person includes means for determining the line of sight for each viewing means, means for generating a signal representing the viewer's line of sight, and means responsive to the determining means for steering a desired display into the field of view of the viewing means. The viewing means also includes means for transmitting desired wavelengths of light from the desired display, and for rejecting unwanted wavelengths of light, particularly those wavelengths of light intended for another viewer.

More generally, the greater the separation between the desired wavelength of light images intended for viewing by a first viewer, and the desired wavelength of light images intended for viewing by a second viewer, the better the suppression of cross-talk between the two sets of images. For example, if viewer No. 1 is intended to see images having a wavelength of 815 nanometers, and viewer No. 2 is intended to see images having a wavelength of 750 nanometers, the suppression of cross-talk can be about 10,000 to 1 (optical density=4). If the longer wavelength is 840 nanometers, instead of 815 nanometers, and the shorter wavelength is 715 nanometers, then the suppression could be about 100,000 to 1 (optical density=5). The greater the suppression of cross-talk, the better that the results are. In practice, the gap between the two wavelengths used, where there are two viewers, for example, depends on the capacities of the optical systems used to produce the images. For the viewing means of this invention, the range of wavelengths from which the images for each of the viewers is selected is preferably from about 600 nanometers to about 1,100 nanometers.

In preferred embodiments, the viewing means comprises selective light-transmitting means adapted to be positioned over a viewer's eyes or viewing aids in the path of light from the desired display. Such light-transmitting means transmit substantially all radiance at the desired wavelength, and reflect or absorb all other wavelengths. In some embodiments, for viewer No. 1, a filter such as a Schott RG830 plate, transmits substantially all radiance at 880 nanometers, and rejects or absorbs substantially all radiance at 750 nanometers, over a field of view subtending an angle in the range of about −20° to about +20°.

For viewer No. 2, a filter such as a Sinott holographic optical element (HOE), double holographic optical element or multi-layer thin film filter absorbs or reflects substantially all radiance at 880 nanometers over a field of view subtending an angle in the range of about −20° to about +20°, and transmits all radiance at 750 nanometers. Such filters are of known kinds. The thin film filter can be, for example, a 43-layer stack of alternating $Ta_2O_5$ and $SiO_2$ layers, each of one-quarter wave thickness, with the exception of the first three layers and the air interface layer.

BRIEF DESCRIPTION OF THE DRAWINGS

The invention can better be understood by reference to the drawings, in which:

FIG. 1 is a graph showing the spectral response of a preferred embodiment for a first viewer's light filter;

DETAILED DESCRIPTION OF THE INVENTION

FIG. 1 shows graphically the performance of several different infrared-transmitting filters that transmit substantially all radiance at 880 nanometers wavelength, and rejects or absorbs all radiance at 750 nanometers wavelength, i.e., RG780, RG830 and RG850.

Figure 2B:
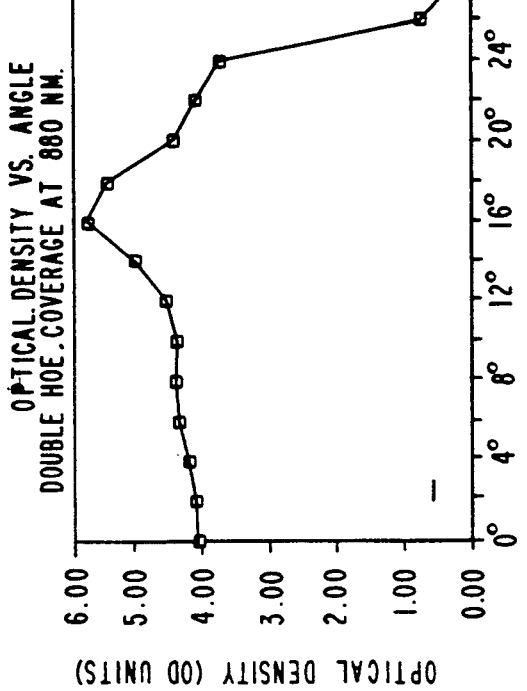
FIGS. 2a and 2b include two graphs showing, for a second viewer, the angular response using single and double holographic optical elements.
Figure 2A:
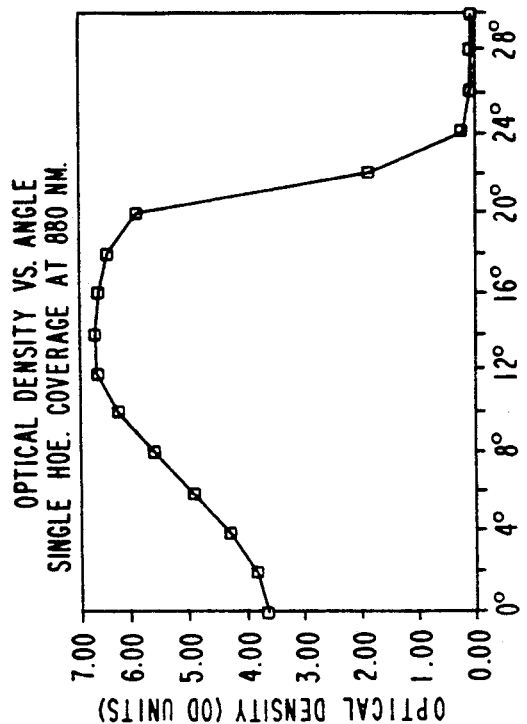
Figure 3:
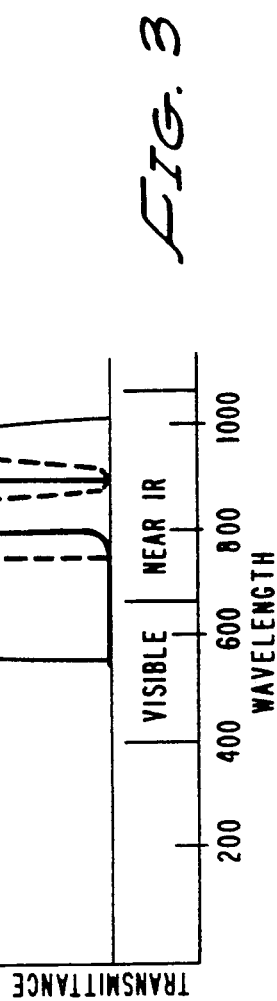
FIG. 3 shows the spectral response for the two viewer's filters and displays the spectral response of generation 3 night vision goggle (NVG) viewing aids.

FIGS. 2a and 2b show the estimated optical density versus field of view of single and double holographic optical element (HOE) light filters for a second viewer. As shown in FIG. 3, the second viewer's filters transmit substantially all radiance at 750 nanometers wavelength, and reject or absorb substantially all radiance at 880 nanometers wavelength.

In preferred embodiments, dichromated gelatin-based holographic elements (DCG) are useful for display and filter purposes because of their low scattering properties and their high index modulations. DCG holographic filters as thick as 80 microns and with phase gratings having an index modulation of about 0.06 are particularly useful.

Holographic infrared filter elements are preferably either single-layer or double-layer elements. The single-layer element is simpler because it utilizes only one hologram. The double-layer element uses two complementary gratings, one for each of the two field angle ranges, i.e., high and low. In such devices, the angular bandwidth requirements for each element is reduced.

A single-layer hologram filter designed to cover a field of view of about ±20° with a maximum optical density of 4 at 880 nanometers has the following characteristics: thickness (t) of about 45 microns, grating spacing (L) of about 894.5 nanometers and index modulation of about 0.053. FIG. 2a shows the optical density plotted against input angle, measured in degrees, in air, at 880 nanometers, for randomly polarized light from a single holographic optical element filter. The curve is symmetric about 0°, and thus describes the extinction properties over the entire 40° field. Theoretical transmission for the same hologram at 750 nanometers, neglecting scattering and absorptive losses, exceeds 95% over the same range.

With double-layer holographic filters, the angular coverage requirement is divided between the two elements. One hologram covers the range from about 0° to about 17°, and the second hologram covers the range from about 15° to about 24°. FIG. 2b represents a composite of the two HOE filter layers. The lump in the curve at incidence angles near 16° is due to overlap in the coverage between the two holograms. As FIG. 2b shows, the associated parameters are less stringent than in the single element case. Thus, the thickness of each hologram can be about 35 microns. The grating spacings are 887 nanometers, and 906 nanometers. The modulation indices are about 0.045.

With double-layer filter holograms, each hologram can be thinner than a single-layer filter. Each can have lower modulation requirements. Further, angular coverage at the minimum optical density of 3 is about a 48° theoretical field of view, allowing for inherent spatial inhomogeneities. As a result, such filters are more easily produced than single-layer filters, and at lower cost. With the double-layer filters, a contrast ratio of 10,000 to 1 is attainable over the required 40° theoretical field of view.

FIG. 3 shows the use of two different light filters by two different viewers, such that each viewer sees a display intended only for him without seeing a simultaneous display intended for another viewer within the same catadioptric area-of-interest projection system. The spectral response of a generation 3 night viewing goggle (NVG) viewing aid is typically from 600 to 1,100 nanometers. Hence, the wavelengths selected for each of the two viewers should be within this wavelength range.

Figure 4:
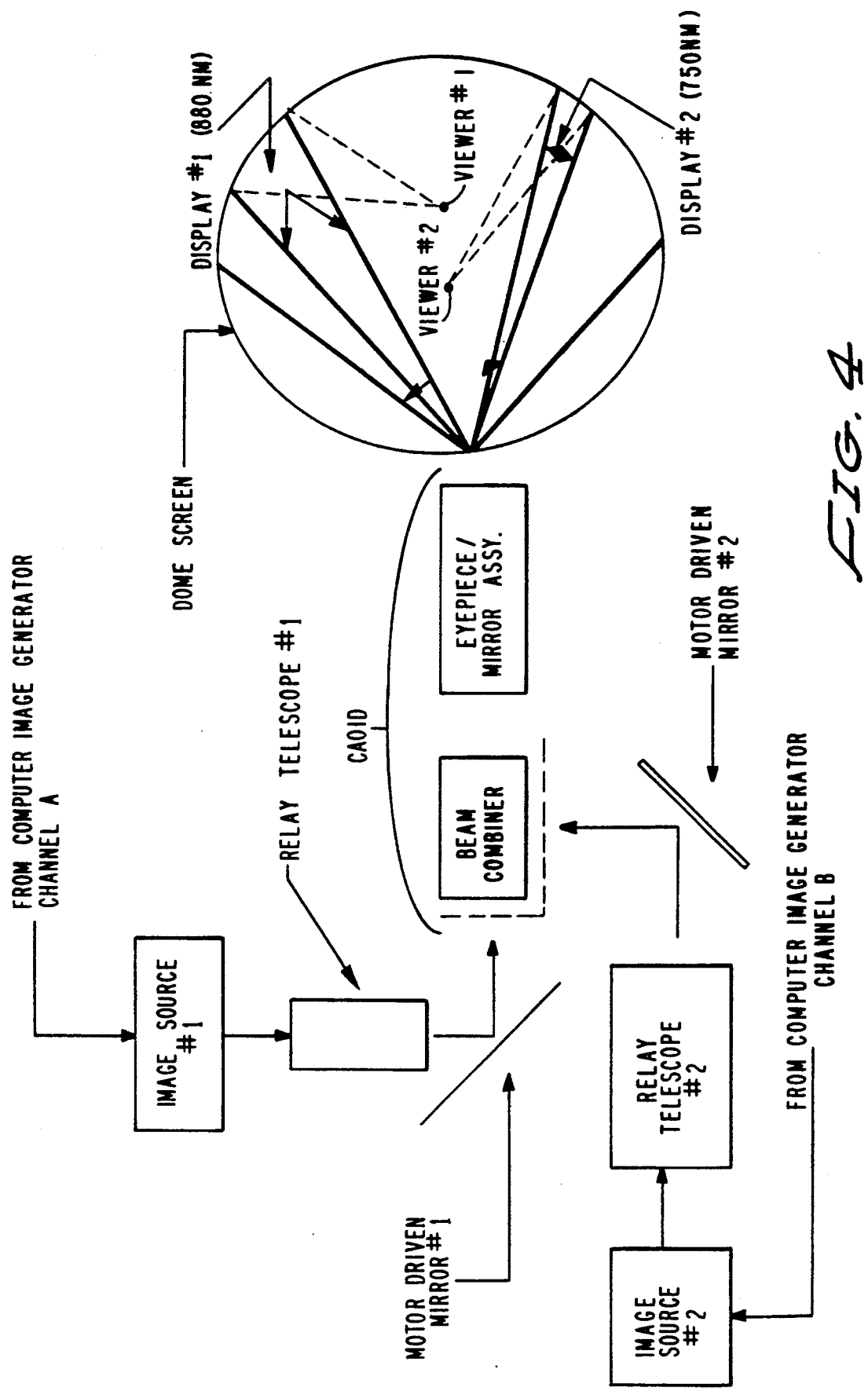
FIG. 4 is a schematic diagram showing the simultaneous viewing of two different sets of images by two different viewers in which cross-talk between the two sets is minimized.

FIG. 4 shows display No. 1 at 880 nanometers wavelength which can only be seen by the first viewer, and display No. 2 at 750 nanometers wavelength, which can only be seen by the second viewer.

In catadioptric area-of-interest display projection systems, with two viewers, such as the pilot and weapons system officer of a jet fighter simulator, simultaneously present during a night-viewing simulation, each wears viewing means, such as night-vision goggles to amplify the dim light to usable levels. Sensors determine the direction that each viewer's goggles are pointing, and generate one or more signals to direct simultaneously one area-of-interest display into the field of view of one viewer, another display into the field of view of the other. See FIG. 4.

To prevent the pilot and the weapons system officer from seeing the display intended for the other viewer, each viewer's goggles include a filter for each eye to reject incident light that originates with the display intended for the other viewer, and to transmit only the light from the display intended for him.

Independent, non-interfering displays also prevent perspective distortion, which depends on the finite distance from each viewer to the display. For example, assuming the use of a two-position fighter simulator inside a 30-foot diameter dome, one viewer may have perspective distortion error up to 20° if he sees the display intended for the other viewer. The viewing means of the invention permit this problem to be solved by image distortion correction techniques uniquely tailored for each observer.

Image sources for display No. 1 and for display No. 2 may be devices that convert electrical video signals to spatially modulated displays at the desired wavelength. Relay telescopes No. 1 and No. 2 transfer the displays from the sources to the eyepiece/mirror assembly of the catadioptric area-of-interest display projection system (CAOID).

The CAOID projects the displays onto the dome screen. The beam combiner combines the two displays into a common optical path. The motor-driven mirrors steer the displays to the desired locations on the dome screen. A complete description of these CAOID devices appears in copending U.S. patent application Ser. No. 07/347,111, filed May 3, 1989, now U.S. Pat. No. 5,004,331, and entitled, "Catadioptric Projector, Catadioptric Projection System and Process." The entire disclosure of that application is incorporated herein by this reference.

What is claimed is:

1. A complementary viewing system for a first and second viewer simultaneously using said system comprising:

means for directing a first image toward the first viewer, while simultaneously directing a second image toward the second viewer, said first image being at least partially in the field of view of the second viewer and the second image being at least partially in the field of view of the first viewer;

first selective light transmitting means positioned in the path of the images directed toward said first viewer, said first selective light transmitting means for transmitting the first image to the first viewer, said first image comprising radiance at substantially only a first predetermined wavelength, and said first selective light transmitting means for rejecting or absorbing substantially all radiance at substantially all other wavelengths; and second selective light transmitting means positioned in the path of the images directed toward said second viewer, said second selective light transmitting means for transmitting the second image to the second viewer, the second image comprising radiance at substantially only a second predetermined wavelength which is different from said predetermined wavelength and said second selective light transmitting means for rejecting or absorbing substantially all radiance at substantially all other wavelengths, whereby each viewer can simultaneously view a respective image without interference by the other image.

2. system of claim 1 wherein said viewing system includes catadioptric area of interest displays.

3. The system of claim 1 wherein said first transmitting means is a filter.

4. The system of claim 3 wherein said first and second wavelengths are infrared.

5. The system of claim 3 wherein said first selective light transmitting means comprises goggles.

6. The system of claim 3 wherein said second selective light transmitting means comprises goggles.

7. The system of claim 1 wherein said second transmitting means is selected from the group consisting of a single holographic element, multiple holographic elements, or thin films.

* * * * *